(12) United States Patent
Everth et al.

(10) Patent No.: US 9,341,703 B2
(45) Date of Patent: May 17, 2016

(54) SYSTEM AND METHOD FOR IDENTIFYING A COMPONENT

(71) Applicant: Airbus Operations GmbH, Hamburg (DE)

(72) Inventors: Henning Everth, Hamburg (DE); Dietrich Lampe, Dresden (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 85 days.

(21) Appl. No.: 14/106,230

(22) Filed: Dec. 13, 2013

(65) Prior Publication Data

US 2014/0166740 A1 Jun. 19, 2014

(30) Foreign Application Priority Data

Dec. 13, 2012 (DE) .......................... 10 2012 112 239

(51) Int. Cl.
*G06F 17/30* (2006.01)
*G01S 5/16* (2006.01)
*G06Q 10/00* (2012.01)

(52) U.S. Cl.
CPC .. *G01S 5/16* (2013.01); *G06Q 10/20* (2013.01)

(58) Field of Classification Search
CPC ....................................................... G06F 17/30
USPC ....................................... 235/375; 340/686.1
See application file for complete search history.

(56) References Cited

U.S. PATENT DOCUMENTS

| 7,391,338 | B2 * | 6/2008 | Eren et al. ................... 340/686.1 |
| 8,320,280 | B2 | 11/2012 | Meyer et al. | |
| 2007/0018820 | A1 * | 1/2007 | Chand et al. ................ 340/572.1 |
| 2008/0074264 | A1 * | 3/2008 | Sharpe et al. ................ 340/572.1 |
| 2008/0239478 | A1 * | 10/2008 | Tafas et al. ...................... 359/396 |
| 2011/0199185 | A1 * | 8/2011 | Karaoguz et al. .............. 340/8.1 |
| 2012/0053779 | A1 | 3/2012 | Fischer | |

FOREIGN PATENT DOCUMENTS

| DE | 10122958 A1 | 11/2002 |
| DE | 10227581 A1 | 1/2004 |
| DE | 102005055102 A1 | 8/2006 |
| DE | 102005033544 A1 | 1/2007 |
| DE | 102005036057 A1 | 2/2007 |
| DE | 102011005610 A1 | 9/2012 |

OTHER PUBLICATIONS

German Patent and Trademark Office, German Search Report for DE 10 2012 112 239.3 Dated Jul. 10, 2013.

* cited by examiner

*Primary Examiner* — Allyson Trail
(74) *Attorney, Agent, or Firm* — Ingrassia Fisher & Lorenz, P.C.

(57) ABSTRACT

A system for checking the positioning of components is provided. The system includes a reading device for reading in component identification information, which is provided by an identification device in a spatially limited region about a component to be checked, a locating device with at least one stationary reference device, a movement component which is movable relative thereto and a computing unit. The reading device and the locating device can be connected to the computing unit. The computing unit is set up to detect a relative position of the movement component with respect to the at least one reference device in the spatially limited region about the component to be checked and to form a data pair from the detected relative position with component identification information read in by means of the reading device and to compare it with predefined data pairs.

18 Claims, 4 Drawing Sheets

SYSTEM AND METHOD FOR IDENTIFYING A COMPONENT

CROSS-REFERENCE TO RELATED APPLICATIONS

This application claims priority to German Patent Application No. 10 2012 112 239.3, filed Dec. 13, 2012, which is incorporated herein by reference in its entirety.

TECHNICAL FIELD

The technical field relates to a system for identifying components and a method for identifying components.

BACKGROUND

When manufacturing complex devices, machines or the like, a large number of different components are often used, which, in cooperation, produce a complex system. The proper functioning of this system depends on whether the correct components were used and function faultlessly. To identify components used in the course of maintenance or an inspection, in modern, relatively large aircraft, for example commercial aircraft, identification devices such as RFID tags are used. The reading out of identification devices of this type is, in particular, advantageous if a visual check is impossible because of the installation situation. The identification of orifice plates within an air line of an air conditioning system is mentioned merely by way of example. The successive identification of components ensures that the correct components necessary for proper operation are present and installed at the correct position.

Other objects, desirable features and characteristics will become apparent from the subsequent summary and detailed description, and the appended claims, taken in conjunction with the accompanying drawings and this background.

SUMMARY

In addition to the actual identification, the installation sites of the identified components are to be checked. This is relatively laborious, in particular when it is a question of checking a large number of very similar components or those of the same type. The orifice plates mentioned above in an air line of an air conditioning system of a relatively large vehicle frequently only differ from one another, for example, due to the coefficient of resistance to be adjusted in each case but, however, have basically the same type of construction. In order to avoid confusions or faulty positioning, it is sensible to check the installation positions of these orifice plates.

Accordingly, the various teachings of the present disclosure provides a system and a method for efficient and reliable component identification and positional determination.

The system for checking the positioning of components comprises a reading device for component identification information, which is provided by an identification device in a spatially limited region about a component to be checked, a locating device and a computing unit, the reading device and the locating device being connectable to the computing unit, the locating device comprising at least one stationary reference device and a movement component that is movable relative thereto, and the computing unit being configured for detecting a relative position of the movement component with respect to the at least one reference device in the spatially limited region about the component to be checked, for forming a data pair from the detected relative position with component identification information read in by means of the reading device and for comparing it with predefined data pairs.

The reading device is a device which allows the detection or reading out of an identification device that provides component identification information. The identification device may, for example, be in form of a RFID tag, which is arranged on the component to be checked. The reading device may accordingly be an RFID reading apparatus, which, with the aid of the inductive transmission of an energy quantity to the RFID tag, causes said tag to transmit an identification code, which is then received and stored by the reading device, forwarded and/or further processed. The received identification code is to be regarded as component identification information, which may contain an identifier unique to each component within a system, a system group or a total quantity of components of a manufacturer of a superordinate system. Alternatively or in addition to this, the component identification information may contain details about the type of the relevant component. The reading in of the identification code may supply clear and reliable information about the component used. While, in particular, stating the type allows the correct configuration to be checked, the unique identifier may provide information about the manufacturer of the respective component and, in the course of maintenance, provide information about the time of installation of the component, if, when a component is installed or exchanged, its identifier is detected and stored.

The spatially limited region, in which the identification device provides the component identification information, may prevent the reading device receiving too much information, which may no longer be evaluated by the computing unit. The scope of the identification devices should accordingly, in on example, be limited such that the desired information may be retrieved in a targeted manner only from individual identification devices. The spatial limitation may, for example, take place by means of a limitation of the scope of an RFID reading apparatus. In addition or alternatively, the reading device, for example if it is configured as an RFID reading apparatus, may, owing to suitable design measures, have a directed transmitting and receiving antenna, which requires a very precise orientation of the reading device with respect to the component to be checked in order to obtain component identification information. The directing effect, depending on the mode of construction of the antenna, may lead to a very small aperture angle ranging from a few degrees to about 30°. To assist the orientation of the reading device, a strongly directed light beam oriented parallel to the action direction of the antenna may additionally be transmitted, for example by a laser diode. The user may therefore carry out a particularly precise read-out, in one example, of visible components.

The reading device may be configured separately from the locating device or form an integral part thereof. The steps of reading in and the locating may be carried out consecutively with separate devices. A user, who uses the system according to the various teachings of the present disclosure, may accordingly carry a mobile movement component and a reading device and carry out a locating operation after component identification information has been read in.

The main components of the locating device are a mobile, i.e. movable, movement component, which is to be located, and at least one stationary reference device. This is to be taken to mean a device that is rigidly arranged in a relevant space, while the movement component is freely movable in the space and therefore also relative to the at least one reference device. With the aid of different methods, the relative position of the movement component with respect to the at least one reference device may be determined, which will be further shown below, but the teachings of the present disclosure are not to be limited to a specific configuration. All the possible known locating methods or those to be developed in the future are applicable.

The locating device may transmit a relative position to the computing unit, in that, with the aid of a measuring method used, it autonomously emits a specific value for a position, which, depending on the type and requirements of the locating device, may be present in two or three dimensions. For this type of determination of the relative position, the locating device may accordingly itself be equipped to carry out a complete locating operation. As an alternative to this, the computing unit may also determine the location from abstract data, which are sent from the components of the locating device to the computing unit. These data may comprise raw data, which are firstly converted by the computing unit into usable position information and, for example, comprise running time differences or signals, which have been transmitted by a transmitting component of the locating device and have been received by a receiving component of the locating device. From the evaluation of such signals, the computing unit may determine information about the relative position between the mobile movement component and the at least one stationary reference device, which information is then further processed.

The computing unit is configured for forming a data pair from abstract data, for example spacing data between the movement component and the at least one reference device. The detected relative position is correlated or linked with the component identification information of a relevant component in said data pair. A data pair of this type may then easily be compared with corresponding predetermined data pairs in order to obtain information about whether according to an assembly plan or another specification, the identified and located component is arranged at the correct position within the relevant system.

In one embodiment, the system furthermore comprises a database unit, the database unit being configured for correlating component positions and component identifications with one another as predefined data pairs. The computing unit is furthermore connected or coupled to the database unit to request data, for example by means of a wired or wireless communication. The system may correspondingly directly ascertain when carrying out the identification and the positional determination of a component after comparison with predefined data pairs from the database unit whether an identified and located component matches the definition in the database. The computing unit may, for example, retrieve the predetermined component identification information of the identified component at the relevant position from the corresponding dataset of the database unit and compare it with the type of identified component just determined in the associated data pair, which also contains the position. If the provided and actual type do not match, a signal used for warning or information may be produced, which is presented acoustically and/or optically to the user.

Accordingly, in one exemplary embodiment, the computing unit is configured for transmitting read-in component identification information of a component to the database unit and for retrieving position data correlated thereto from a predefined data pair. The computing unit is therefore allowed to check the associated installation site of an identified component.

Likewise, in one embodiment, the computing unit is configured for comparing the detected relative position of the movement component with the correlated position data stored in the database unit.

In addition to this, the computing unit in one embodiment is configured for calculating an absolute position of the component from the relative position using position data of the at least one stationary reference device in a space with predefined geometric extent data before requesting the correlated position data and for using this calculated absolute position as a basis for checking the correct installation position of a component.

In one exemplary embodiment, the at least one reference device comprises a transmitting device, which transmits a signal that is receivable by the movement component, the locating device or the computing unit being configured for determining a relative position of the movement component with respect to the reference device from a running time of the signal transmitted by the at least one reference device. The movement component is accordingly configured for receiving a signal from the reference device and for determining a running time of the signal. Therefore, a relative position with respect to the at least one reference device may be determined. The transmitted signal may be an invisible, electromagnetic signal, alternatively also in the form of a light beam.

In one embodiment, the at least one reference device comprises a receiving device, which receives a signal transmitted by the movement component, the locating device or the computing unit being configured for determining a relative position of the movement component with respect to the reference device from a running time of the signal transmitted by the mobile movement component. The movement component is accordingly configured for transmitting a signal to the reference device. The transmitted signal may also be an invisible, electromagnetic signal here, alternatively also in the form of a light beam.

In one embodiment, the locating device comprises a plurality of stationary reference devices, the locating device or the computing unit being configured for determining running time differences between the signals of the individual reference devices with respect to the movement component and to determine the relative position of the movement component with respect to the reference devices from the running time differences. Therefore, depending on the number of reference devices, any desired position may be established in a two-dimensional plane or a three-dimensional space.

In one exemplary embodiment, the at least one reference device comprises one or more optical imaging devices and is configured for following a running path of the movement component. The movement component may, for example, be configured to be optically striking in such a way that it cannot be confused with other devices or components of the space to be monitored and its size is defined in such a way that a removal or the approach of the movement component with respect to the reference device may be determined clearly and adequately precisely. Obviously, a reference device of this type may also be configured in a multiple manner, so that the running path of the movement component in the space may be determined with a plurality of optical imaging devices, for example from a plurality of different angles of observation.

In one embodiment, the movement component accordingly comprises a marker body that is detectable by the at least one reference device. Said marker body should as far as possible be free-standing and be visible from all sides.

In one exemplary embodiment, the marker body is a light source with adjustable colour. The adjustability of the colour does not necessarily relate to the fact that the colour is changeable at any time. Rather, it may be advantageous to transmit a light with a specific colour instead of a white light, so that clear recognisability is provided. The colour may be adjusted once or before use, it being possible, in one example, for a desired colour to be selected from a limited number of colours. This colour may by way of example be selected in such a way that it does not correlate with colours occurring in the relevant space and possibly forms a complementary contrast to a preferred colour in the space if this should be possible. The marker body may furthermore have a regular geometry in one example. Therefore, the removal of the movement component may be reliably seen by the at least one optical imaging device.

In one exemplary embodiment of the present disclosure, the locating device furthermore comprises at least one additional sensor from a group of additional sensors, the group comprising: an inertia measuring device, which is mechanically connected to the movement component and is configured for detecting accelerations in at least one spatial plane, and a magnetometer, wherein the at least one additional sensor is configured for providing detected data to the locating device.

An inertia measuring device mechanically connected to the movement component may assist the spatial positional determination of the movement component in order to achieve as exact a positional determination as possible. An inertia platform comprises, for example, three acceleration sensors, which enclose about a 90° angle with respect to one another in each case, so the acceleration in each spatial direction is detectable. By means of the integration of the respective acceleration values, the instantaneous speed of the movement component is determined, which leads, after renewed integration, to a determined position. This position may, for example, be improved by means of a weighted averaging method using the determined position by means of the combination of the at least one reference device and the movement component. The use of a magnetometer may furthermore, by detecting the magnetic field of the Earth, produce data, regardless of an acceleration, on a spatial orientation, based on the functioning principle of a compass.

When using inertia measuring devices it is to be noted that a drift may occur so, for example, before beginning a measurement, the movement component should be held at a reference point in the space to be monitored in order to carry out a calibration. Nowadays, micromechanically produced acceleration sensors are obtainable and have a very high degree of precision and a consistent drift behaviour.

Furthermore, for more precise determination of the relative position of a component, the route from the reading device to the identification device may be superimposed taking into consideration the information of the additional sensors if the reading device, as shown above, reads out from the identification device at a preferred orientation. The length of this route may also be estimated due to the limited scope of the reading device. However, it is also conceivable to couple a light beam used for the optical assistance of the user to a distance measuring device, which supplies information about the distance of the reading device from a face reflecting the light beam.

In one embodiment, the locating device or the computing unit is accordingly configured for assisting the positional determination of the movement component relative to the at least one stationary reference device with the data provided by the at least one additional sensor.

In one exemplary embodiment, the movement component, the reading device and the computing unit are integrated in a mobile apparatus, which comprises a display unit and an operating unit. Thus, a reading process may be initiated by a hand-held mobile apparatus and any warnings or status report may be output by the output unit. The output unit may output both optically, acoustically and also haptically, for example by vibrations, warnings or other indications. The outputting of an indication may be sensible, for example, if component identification information has been detected or if a location operation has been successfully concluded in order to give the user a corresponding feedback that the mobile movement component may be removed again from the site to be located.

As already outlined above, the formation of position-dependent detection data may comprise the optical detection of the relative position and the optical detection of a running path of a marker body of the mobile movement component, the at least one reference device being configured as an optical imaging device.

The various teachings of the present disclosure furthermore relates to a method for identifying components, having the steps of detecting the relative position of a mobile movement component with respect to at least one stationary reference device, the reading in of component identification information by means of a reading device and the comparison of a data pair of the detected relative position and the read-in component identification information with predefined data pairs.

In this method according to the present disclosure, the detection of the relative position may comprise the optical detection of a running path of a marker body of the mobile movement component, the at least one reference device being configured as an optical imaging device. Obviously, all further components outlined above may be used.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
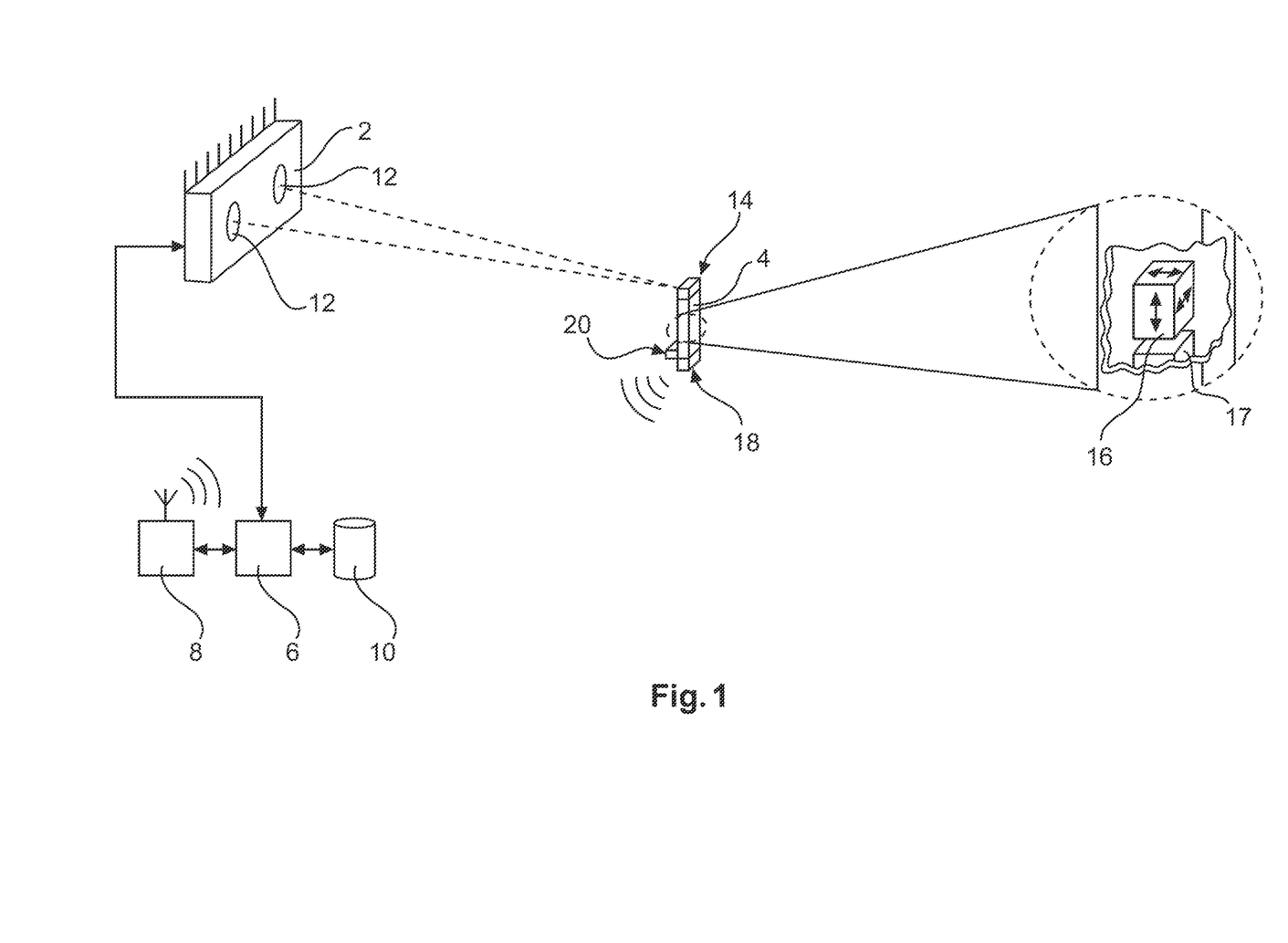
FIG. 1 shows a schematic view of an exemplary system for identifying a component.

FIG. 1 shows an exemplary embodiment of the system according to the various teachings of the present disclosure with a locating device comprising a stationary reference device 2 and a mobile movement component 4, a computing unit 6, a transmitting and receiving unit 8 connected to the computing unit 6 and a database device 10 coupled to the computing unit 6. The reference device 2 is stationary and by way of example equipped with two optical imaging devices 12. These allow a marker body 14, which is arranged on the mobile movement component 4 and highlighted by colour and/or in a self-illuminating manner, to be optically detected. As the term already infers, the mobile movement component 4 is freely movable in all spatial directions, so the marker body 14 arranged thereon may continuously change its detectable position relative to the reference device 2.

The movement of the marker body 14 that may be registered by the optical detection units 12 may be converted into a change of the relative position. For this purpose, on the one hand, the fact is decisive that the marker body 14 optically has a changing size owing to its changing distance from the reference device 2 of the imaging devices, which size may be determined by the reference device 2, in order to be able to in turn determine therefrom a distance of the movement component 4.

On the other hand, the position of the marker body 14 within all the detection planes, which are fixed by the stationary mounting of the reference device 2 and are located, for example, parallel to the face of the reference device 2, in which detection planes the optical detection devices are arranged, may be used to determine a lateral or vertical position component. By using two optical detection devices 12, which are spaced from one another as shown in FIG. 1, an observation of the marker body 14 is possible from two different viewing directions, which in turn allows conclusions about the spatial position. This principle of binocular perspective may allow a very precise calculation of the spatial position of the mobile movement component 4 in the space with the aid of generally known stereo algorithms.

The image data detected by the reference device 2 are transmitted to a computing unit 6 in the variant shown in FIG. 1, which computing unit is, for example, rigidly installed in the relevant object, for example an aircraft and is connected by a wired or wireless data connection to the reference device 2. By means of a corresponding evaluation algorithm, which is based on the evaluation of the lateral, vertical and longitudinal position components, which are in turn assisted as described above, the computing unit 6 may calculate an absolute position of the mobile movement component 4 in the space. As an alternative to this, the locating device itself, i.e. for example the stationary locating device 2 or the mobile movement component 4, may be configured for determining the relative position between the mobile movement component 4 and the stationary reference device 2.

If the relevant space, in which the mobile movement component 4 may move, extends, for example, significantly more in the longitudinal direction than in the vertical or lateral direction, it may be helpful to assist the positional determination by means of further data. As one possibility, it is recommended to integrate an inertia measuring device 16, which is also known as an inertia platform, in the mobile movement component 4. This substantially comprises three inertia sensors, which are arranged on three planes that are perpendicular to one another and allow an inertia-based positional determination. The data, which are produced during the operation of an inertia platform 16 of this type, may be transmitted by a wireless transmitting and receiving device, which is arranged on the mobile movement component 4, to a stationary transmitting and receiving device 8, which is connected to the computing unit 6. In this case, the data may either comprise a position determined by the inertia measuring device 16 and alternatively also the raw data of the individual inertia sensors, from which a position or position change may be determined. If the relative position of the mobile movement component 4 is directly determined within the locating device, it would also be possible to transmit no data or raw data to the computing unit 6. Furthermore, the mobile movement component 4 may also have a magnetometer 17, which senses the orientation towards the terrestrial magnetic field in particular in a horizontal plane and provides it in the form of data. The precision of the detected position of the mobile movement component 4 in the space is clearly improved by this and optionally further additional sensors 16 and 17.

In addition to this, the mobile movement component 4 may have a reading device 20, which allows component identifications to be determined by means of identification devices. The reading device 20 may, for example, be configured as an RFID reading apparatus, which may read identifications of RFID tags, which are integrated in components. By means of the transmitting and receiving component 18, the detected component identification information may be transmitted to the computing unit 6, which is then able to form a data pair comprising the component identification information and position. Predefined data pairs may be retrieved from the database device 10 in order to compare the data pair formed by the computing unit with the predefined data pairs. In this case, both the detected position and the detected component identification information may be used to retrieve similar data pairs from the database device 10. A position belonging to an identified component may thus be checked or the read-out component information may be checked with the aid of a determined position.

If a comparison of data pairs should produce the fact that an identified component is arranged at an incorrect position or an incorrect component is used, the computing unit 6 may produce a corresponding fault signal which is in turn transmitted by means of the transmitting and receiving device 8 to the mobile movement component 4 to trigger an optical, acoustic or haptic warning signal. The haptic warning signal may be the triggering of a vibration device, by means of which the user, even at a relatively high noise level or in inappropriate light conditions in the relevant space, may reliably recognise the presence of a fault. Apart from a warning function, it is also conceivable to perform an indication function, which, for example, indicates the success of the implemented identification of a component or the positional determination.

Figure 2:
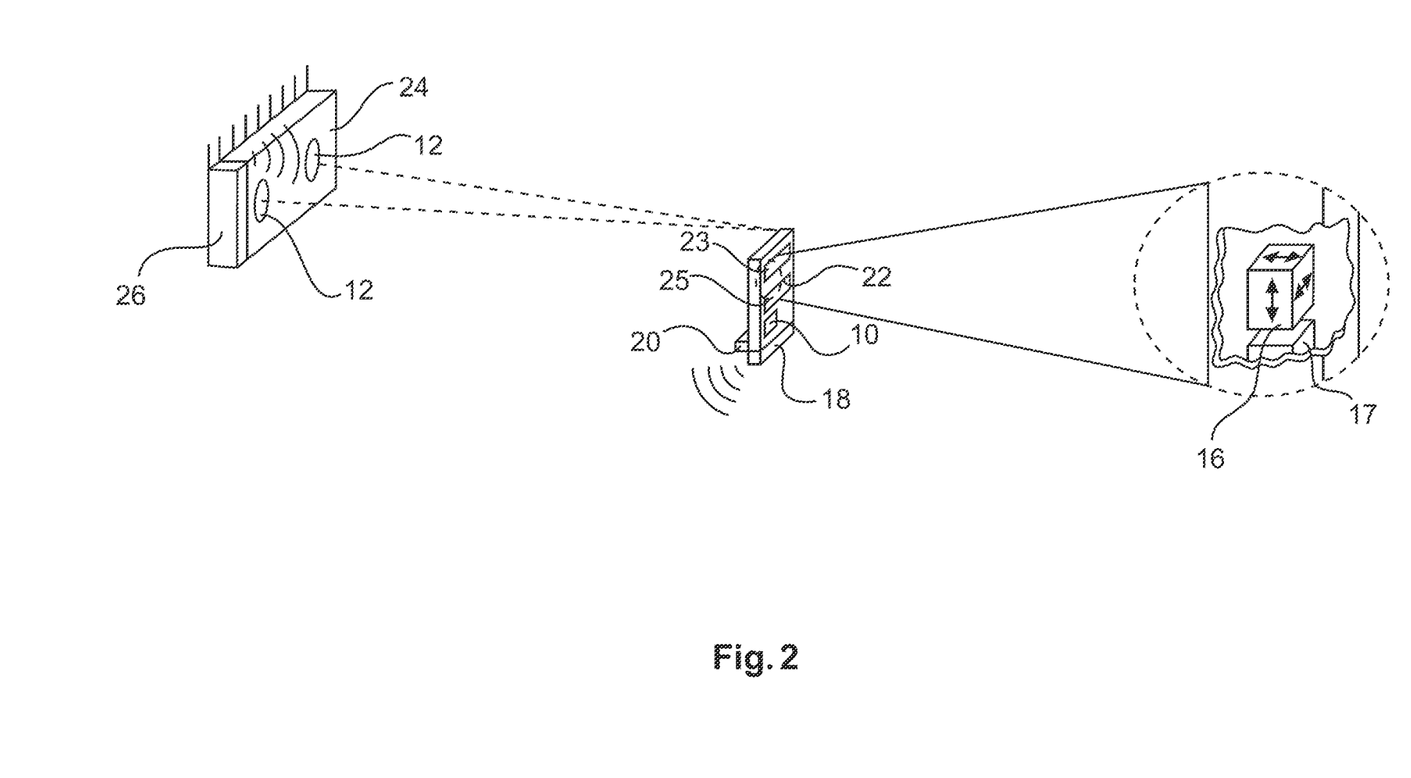
FIG. 2 shows an alternative configuration of an exemplary system for identifying a component.

In the variant shown in FIG. 2, practically the same components are present as in FIG. 1, but the computing unit 6 is integrated in the mobile movement component 22, which, additionally, comprises a display unit 23 to display an operating state, information or warnings. The mobile movement component 22 may furthermore comprise an operating unit 25, by means of which a user may interact with the mobile movement component 22, for example to control the detection. A stationary reference device 24 should accordingly also be equipped with a transmitting and receiving device 26, which is configured for producing a wireless data connection to the mobile movement component 4. The positions are directly determined by the mobile movement component 22 from the incoming data and corresponding warning signals may be directly converted within the mobile movement component 4.

With a greater geometric extent of the relevant space, in which components are to be identified and located, a plurality of systems shown in FIG. 2 may be used, which are to access the same database. The database device 10 may accordingly be configured, as in FIG. 1, as a stationary database device 10, which is connected to a transmitting and receiving device 8. However, it may also be advisable to equip a mobile movement component 4 itself with this database device 10, so the transmitting and receiving device 8 may also be dispensed with. If a plurality of mobile movement components 22 or a plurality of the systems shown in FIG. 2 are to be used, it should be ensured that the databases in all the database devices 10 of the individual mobile movement components 4 always have the same status. For this purpose, it may be advisable to set up the stationary reference devices 24 in such a way that a test sum of a database from each mobile movement component 22 is detected in order to compare the test sums from all the mobile movement components 22 with one another or with a predetermined test sum. Alternatively, it is obviously possible to also equip the stationary reference device 24 with a corresponding database device 10, as a data connection device is necessary in any case to transmit the detected data of the reference device 24.

Figure 3:
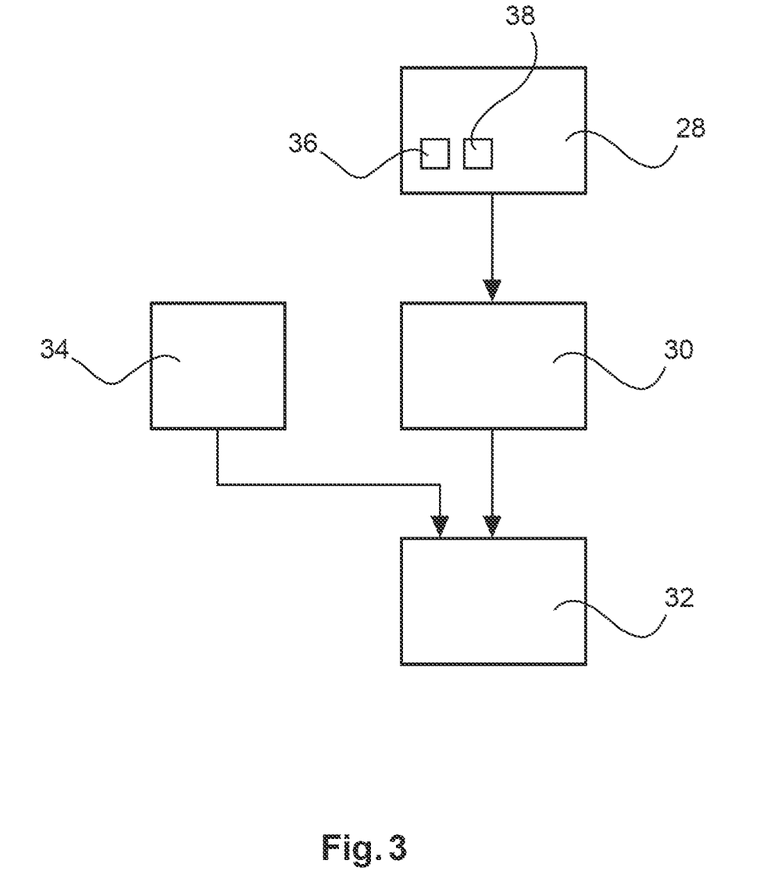
FIG. 3 shows a schematic view of a sequence of a method for identifying a component according to various embodiments.

FIG. 3 shows the basic features of the method according various embodiments. With a stationary reference device, the mobile movement component is detected 28 with the formation of position-dependent detection data, component identification data in one example, being read in at 30 directly beforehand or directly thereafter by means of a reading device 20. The detection data are transmitted to a computing unit, which may then calculate an absolute position of the mobile movement component 4. In addition to this, a further set of position-dependent detection data may be transmitted 34 to the computing unit in order to assist the calculation of the absolute position.

As shown above, the formation of position-dependent detection data may comprise optical detection 36 with one or more optical detection devices as well as the transmitting of a signal, which is received by the mobile movement component and sent back again, whereupon it leads to a generation 38 of detection data by renewed receiving by the reference device taking into account the running time. To detect positions in a three dimensional plane, three or more stationary reference devices would accordingly then be necessary.

Figure 4:
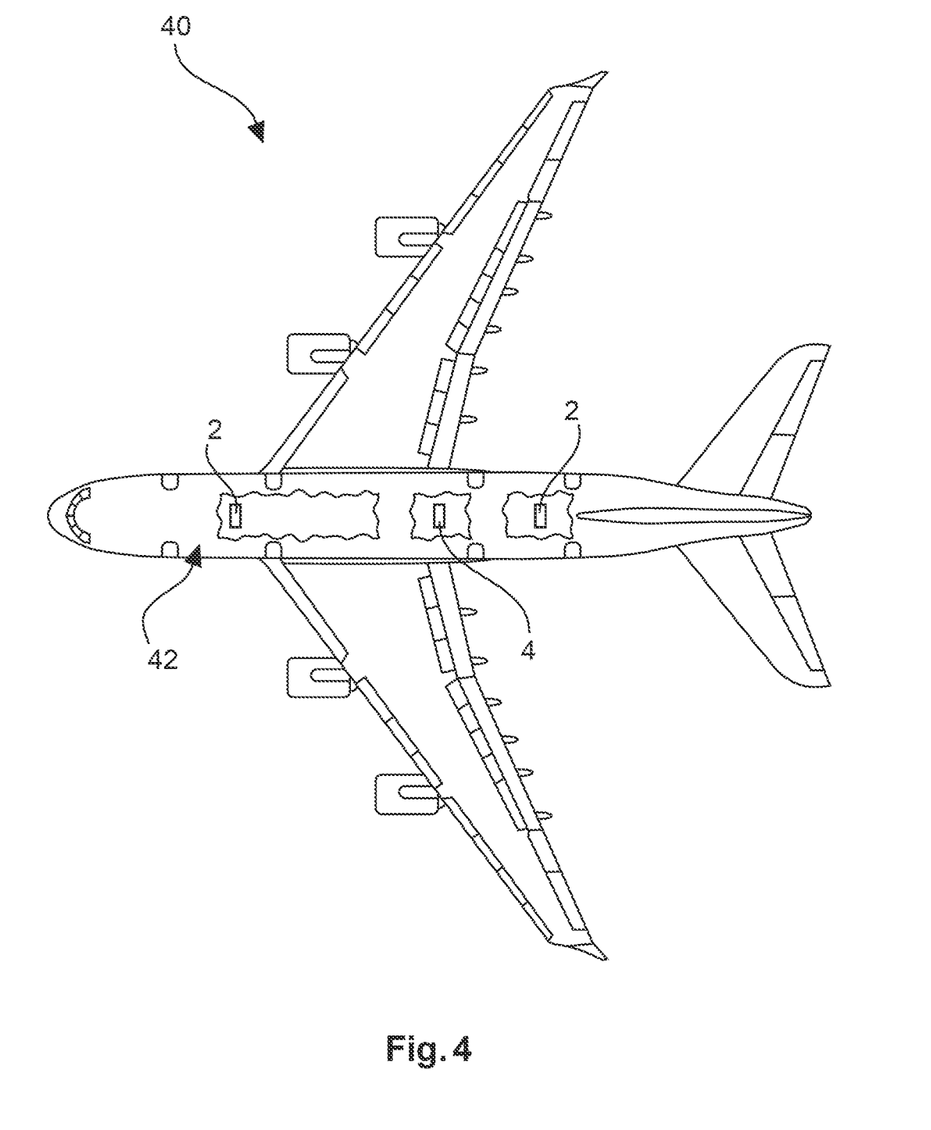
FIG. 4 shows an aircraft in a side view and a partial view, a system according to various embodiments being integrated therein.

By way of example, FIG. 4 shows an aircraft 40, which comprises a cabin 42, in which a system as shown in FIG. 1 is arranged. By way of example, two stationary reference devices 2 are shown in cutouts as well as a mobile movement component 4 that is movable with respect thereto. If the cabin 42 is divided into a plurality of portions, further stationary reference devices 2 may also be present, for which a relative position of the mobile movement component 4 may be detected. The view in FIG. 4 is accordingly not to be regarded as completed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A system for checking a positioning of components, comprising:
    a reading device for reading in component identification information, which is provided by an identification device in a spatially limited region about a component to be checked;
    a locating device with at least one stationary reference device and a movement component which is movable relative thereto; and
    a computing unit, the reading device and the locating device connected to the computing unit;
    wherein the computing unit detects a relative position of the movement component with respect to the at least one stationary reference device in the spatially limited region about the component to be checked, to form a data pair from the detected relative position with component identification information read in by means of the reading device and compares the formed data pair with predefined data pairs,
    wherein the at least one stationary reference has one or more optical image recorders and is set up to detect a running path of the movement component, and
    wherein the movement component has a marker body that is detectable by the at least one stationary reference device.

2. The system according to claim 1, further comprising a database unit, wherein the database unit correlates component positions and component identifications with one another as the predefined data pairs and wherein the computing unit is connected to the database unit to request data.

3. The system according to claim 2, wherein the computing unit transmits read-in component identification information of the component to the database unit and retrieves position data correlated therewith from a respective one of the predefined data pairs.

4. The system according to claim 3, wherein the computing unit compares the detected relative position of the movement component with the correlated position data stored in the database unit.

5. The system according to claim 4, wherein the computing unit calculates an absolute position of the component from the relative position using position data of the at least one reference device in a space with predefined geometric extent data before requesting the correlated position data.

6. The system according to claim 1, wherein the at least one stationary reference device has a transmitting device, which transmits a signal receivable by the movement component, and the locating device or the computing unit determines a relative position of the movement component with respect to the at least one stationary reference device from a running time of the signal transmitted by the at least one stationary reference device.

7. The system according to claim 6, wherein the locating device comprises a plurality of stationary reference devices and wherein the computing unit or the locating device determines running time differences between the signals of individual ones of the plurality of stationary reference devices with respect to the movement component and determines the relative position of the movement component with respect to the plurality of stationary reference devices from the running time differences.

8. The system according to claim 1, wherein the marker body is a light source with adjustable colour.

9. The system according to claim 1, wherein the locating device further comprises at least one additional sensor selected from the group comprising:
    an inertia measuring device, which is mechanically connected to the movement component and is set up to detect accelerations in at least one spatial plane, and
    a magnetometer,
    wherein the at least one additional sensor provides detected data to the locating device.

10. The system according to claim 9, wherein the locating device or the computing unit assists the positional determination of the movement component relative to the at least one stationary reference device with the data provided by the at least one additional sensor.

11. The system according to claim 1, wherein the movement component, the reading device and the computing unit are integrated in a mobile apparatus, which has a display unit and an operating unit.

12. A method for identifying components, comprising the steps of:
- detecting the relative position of a mobile movement component with respect to at least one stationary reference device in a spatially limited region about a component to be checked,
- reading in component identification information, which is provided by an identification device in the spatially limited region about the component to be checked, by means of a reading device; and
- comparing a data pair of the detected relative position and the read-in component identification information with predefined data pairs,
- wherein the at least one stationary reference has one or more optical image recorders and is set up to detect a running path of the movement component, and
- wherein the movement component has a marker body that is detectable by the at least one stationary reference device.

13. The method according to claim 12, wherein the detection of the relative position comprises the optical detection of a running path of a marker body of the mobile movement component, the at least one stationary reference device being configured as an optical image recorder.

14. A system for checking a positioning of components, comprising:
- a reading device for reading in component identification information, which is provided by an identification device in a spatially limited region about a component to be checked;
- a locating device with at least one stationary reference device and a movement component which is movable relative thereto; and
- a computing unit, the reading device and the locating device connected to the computing unit;
- a database unit that correlates component positions and component identifications with one another as predefined data pairs and the computing unit is connected to the database unit to request data,
- wherein the computing unit detects a relative position of the movement component with respect to the at least one stationary reference device in the spatially limited region about the component to be checked, to form a data pair from the detected relative position with component identification information read in by means of the reading device and compares the formed data pair with the predefined data pairs,
- wherein the at least one stationary reference has one or more optical image recorders and is set up to detect a running path of the movement component, and
- wherein the movement component has a marker body that is detectable by the at least one stationary reference device.

15. The system according to claim 14, wherein the computing unit transmits read-in component identification information of the component to the database unit and retrieves position data correlated therewith from a respective one of the predefined data pairs.

16. The system according to claim 15, wherein the computing unit compares the detected relative position of the movement component with the correlated position data stored in the database unit.

17. The system according to claim 16, wherein the computing unit calculates an absolute position of the component from the relative position using position data of the at least one stationary reference device in a space with predefined geometric extent data before requesting the correlated position data.

18. The system according to claim 14, wherein the at least one stationary reference device has a transmitting device, which transmits a signal receivable by the movement component, wherein the locating device or the computing unit determines a relative position of the movement component with respect to the at least one stationary reference device from a running time of the signal transmitted by the at least one stationary reference device.

* * * * *